Aug. 13, 1929.  J. H. BARNES  1,724,167
GEAR CUTTING MACHINE
Filed Oct. 23, 1924    8 Sheets-Sheet 1

INVENTOR.
James H. Barnes
BY
Edward J. Noif
ATTORNEY

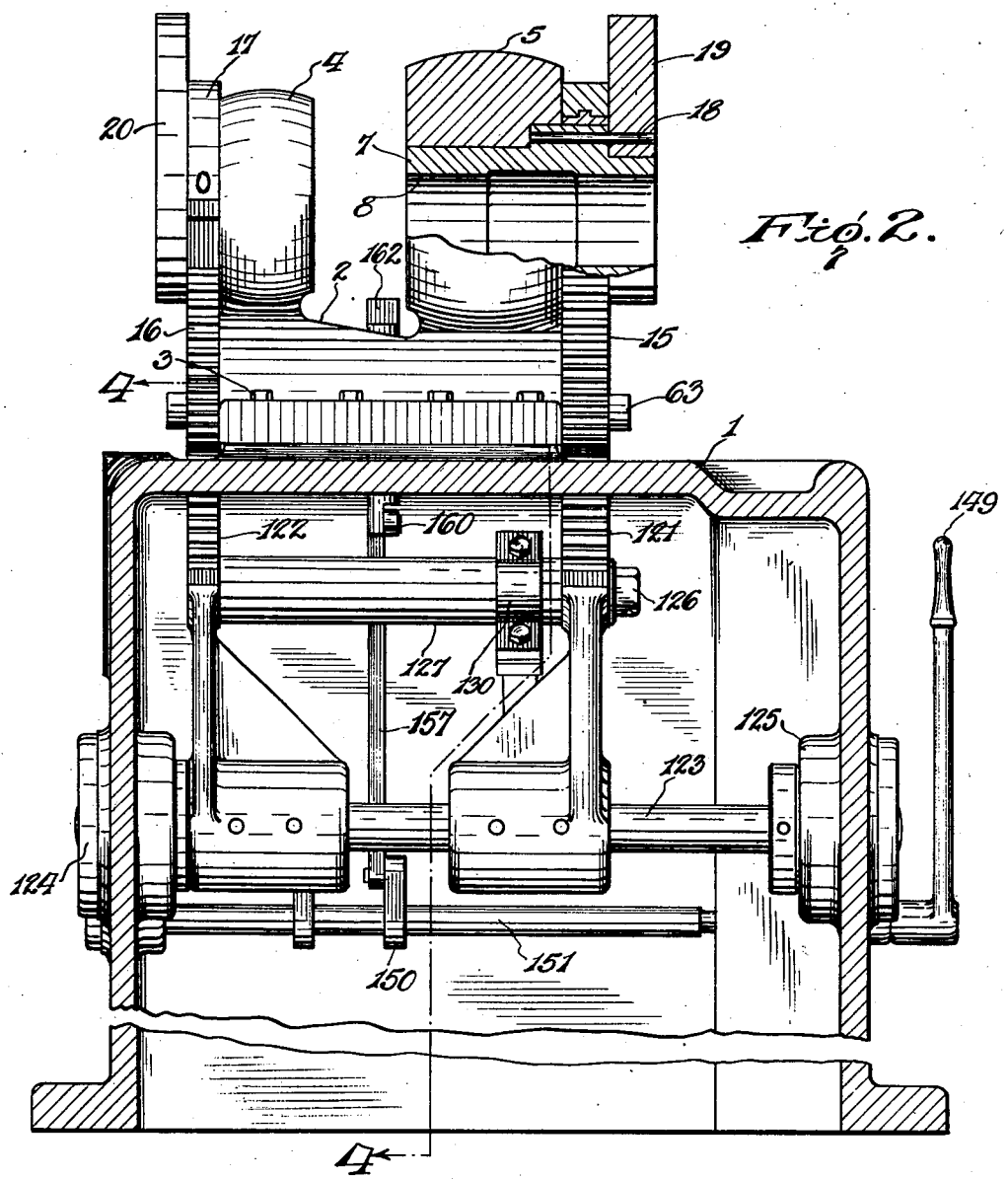

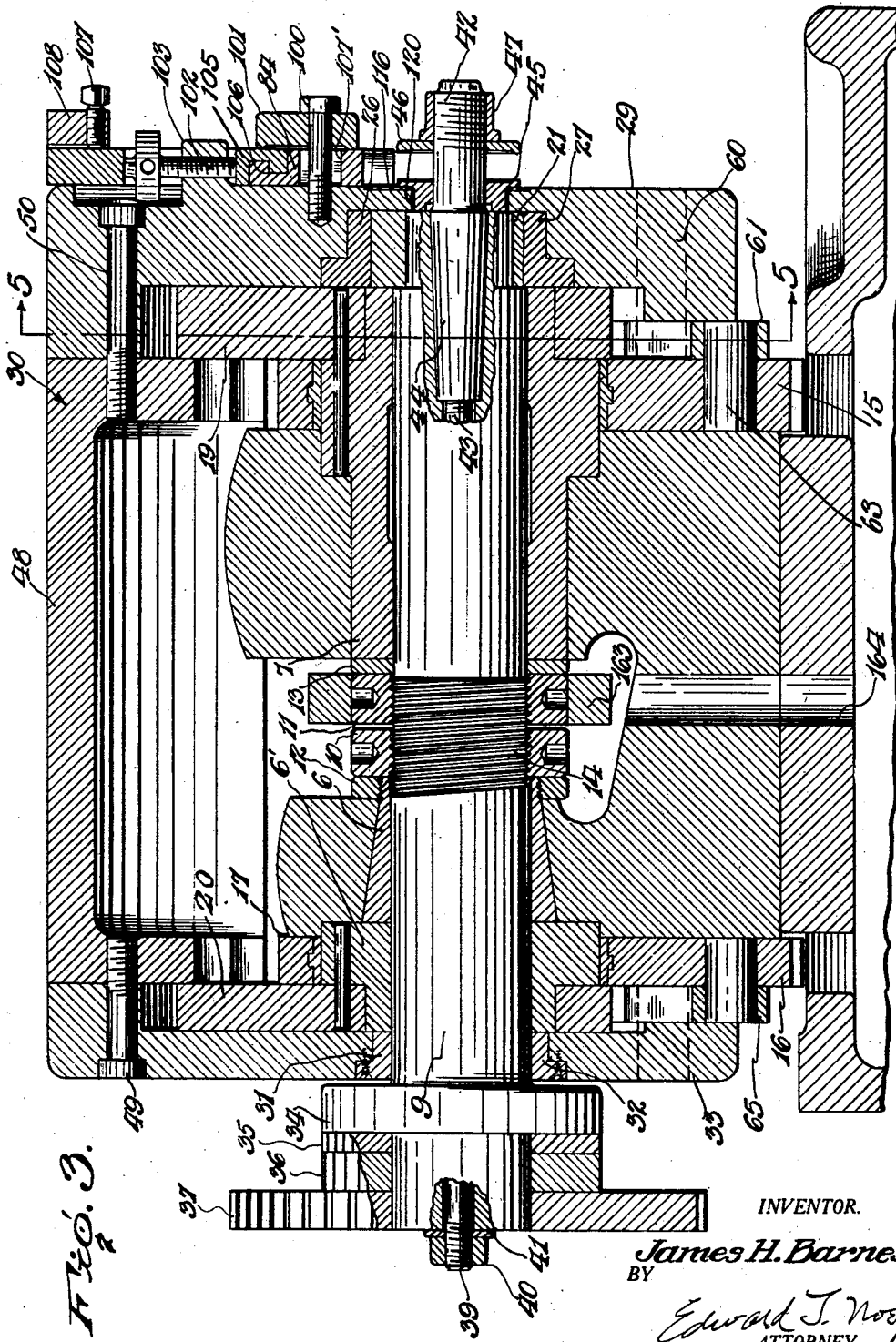

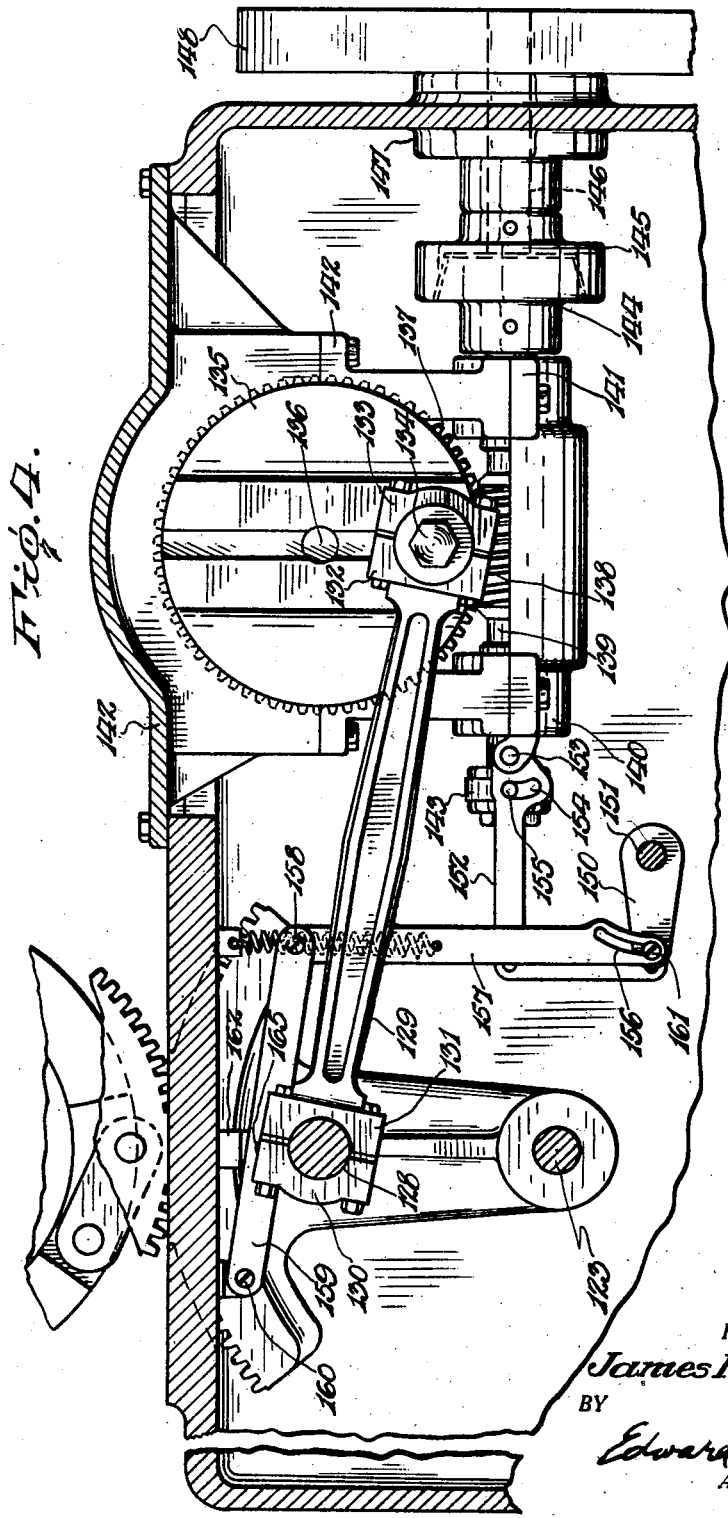

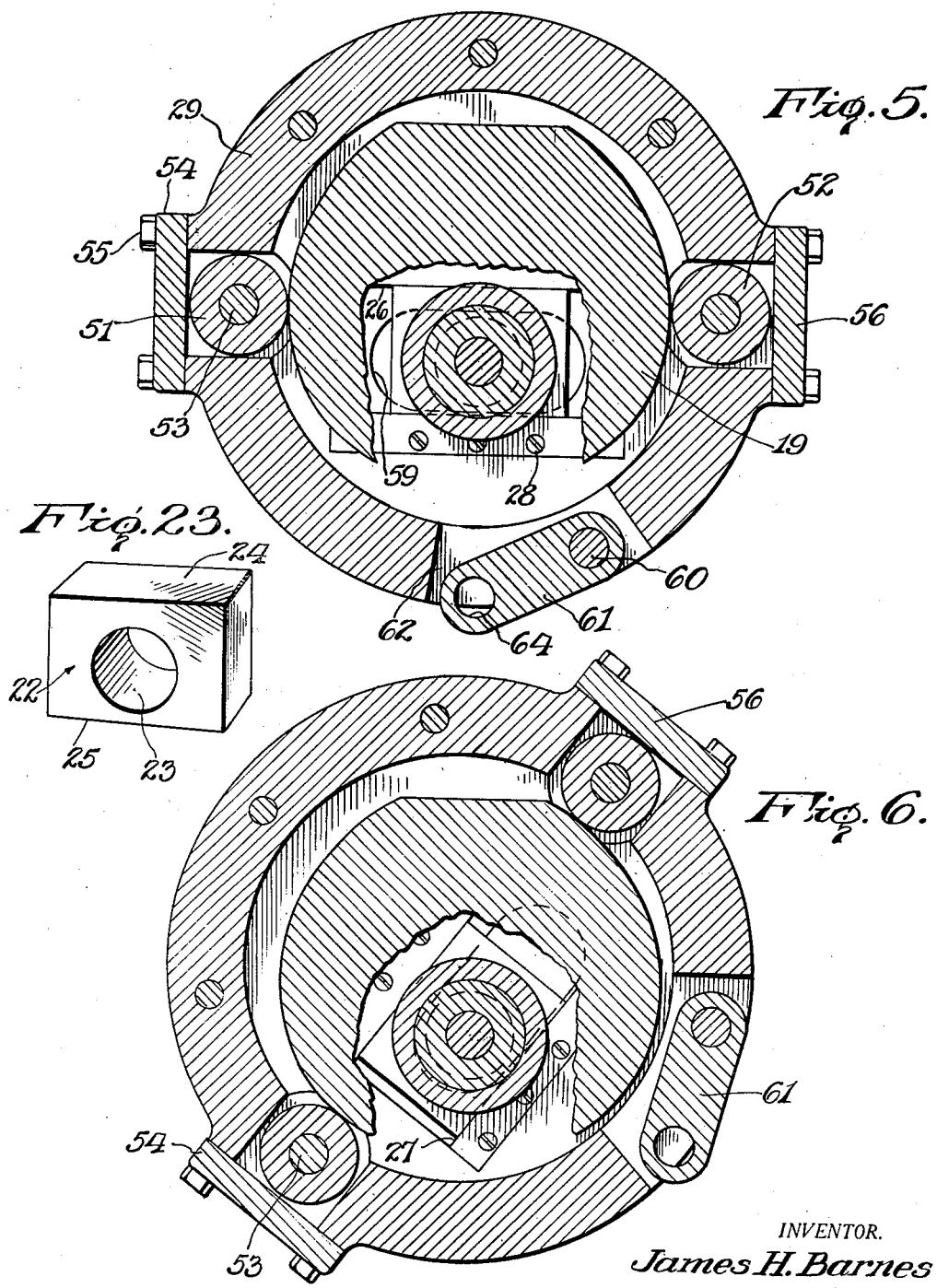

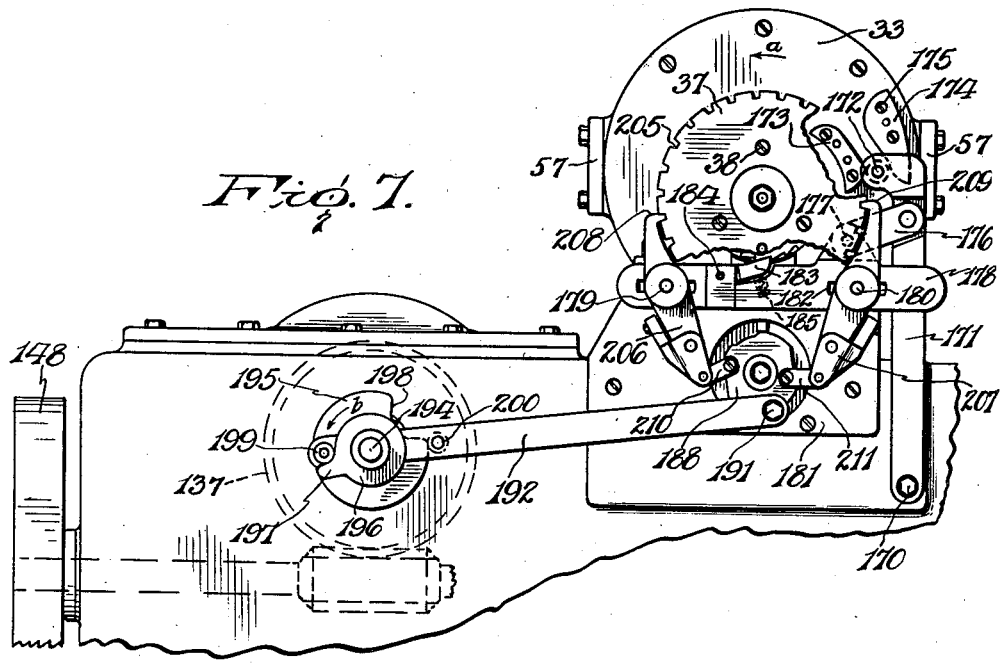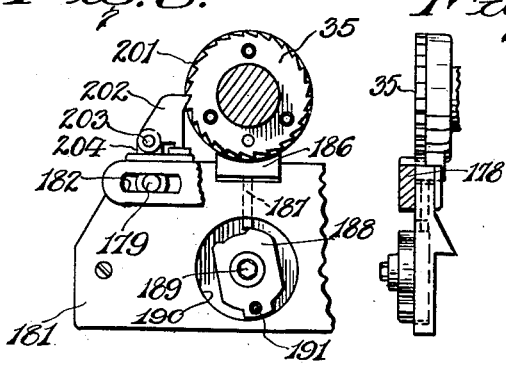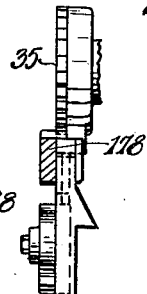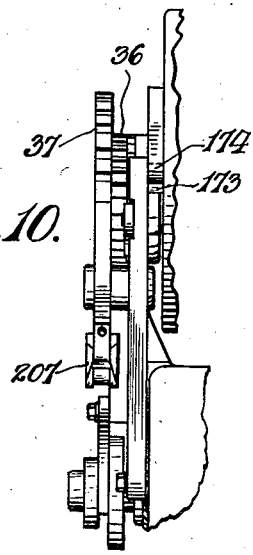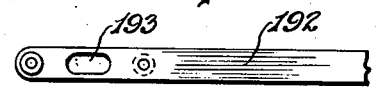

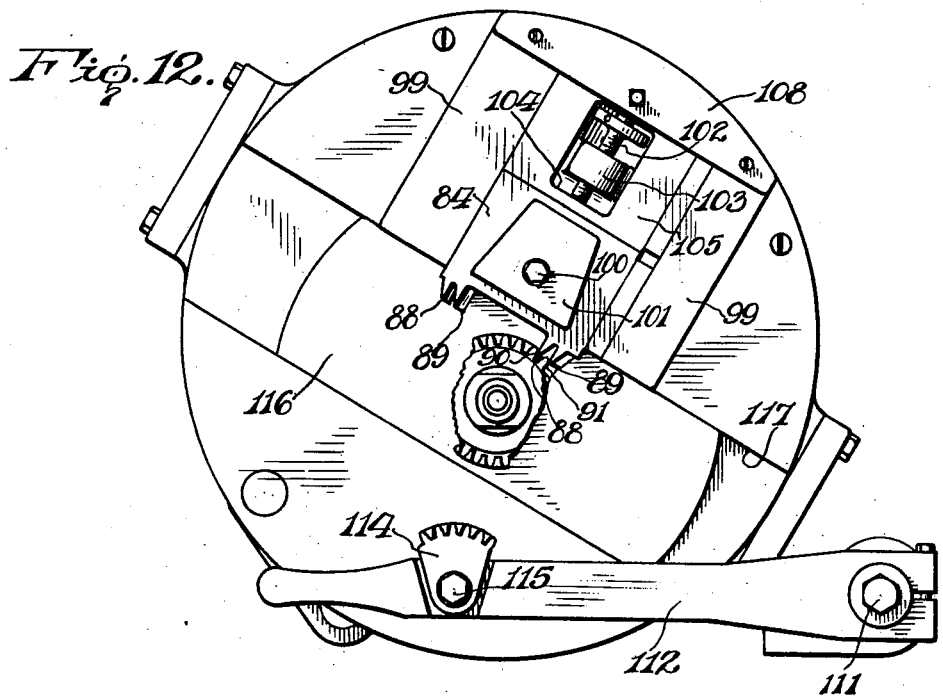
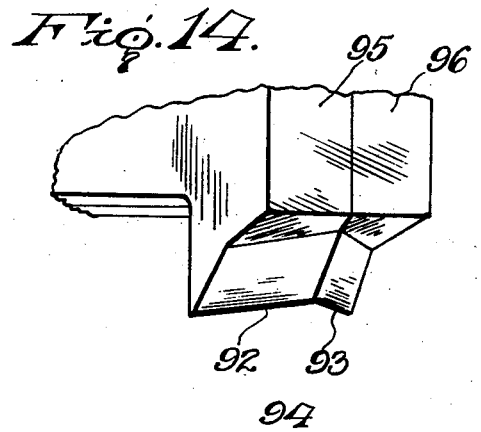
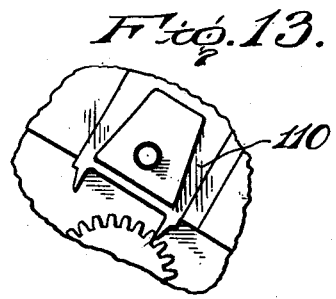
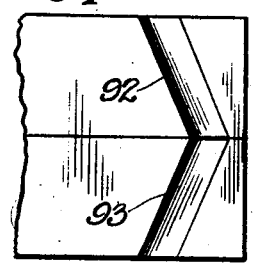

INVENTOR.
James H. Barnes
BY
Edward J. Noe Jr.
ATTORNEYS.

Patented Aug. 13, 1929.

1,724,167

UNITED STATES PATENT OFFICE.

JAMES H. BARNES, OF MONTGOMERY COUNTY, OHIO, ASSIGNOR TO DAYTON CURVOMETER PRODUCTS COMPANY, OF DAYTON, OHIO, A CORPORATION OF OHIO.

GEAR-CUTTING MACHINE.

Application filed October 23, 1924. Serial No. 745,414.

This invention relates to gear cutting machinery and a primary object is the provision of a novel machine for cutting curved surfaces. This is an improvement upon my prior application filed August 27, 1923, Serial No. 659,564 now Patent No. 1,608,052, patented Nov. 23, 1926.

More particularly my invention concerns a machine having a master cam surface provided with opposite involuate curves described about a common base circle which guides a tool holder in such a manner that a shave is made on an involute tooth of a roughed gear blank. The machine is capable of shaving helical, spur, or herring-bone gears as well as curved surfaces of a related nature. The machine makes possible the cutting of helical gears or helical herring-bone gears by a new method of shaving the gear teeth, so that each shave is taken in the direction of roll of the tooth surfaces to cut each point in the surfaces in the direction in which it rolls and slides on mating surfaces. The gear produced by so shaving the teeth is a new article of manufacture since heretofore in the art of cutting gear teeth the cut has been made at right angles to the direction of roll of the working surfaces, thus producing inequalities in the surface in the direction of roll which are productive of noise and wear. The machine is provided with a novel indexing mechanism for the gear blank, by means of which the gear is automatically moved by one mechanism and held in fixed position, while the cut is being made, by an accurate holding device.

The machine is provided with a tool holder which in the example shown is drum shaped. This tool holder is mounted upon the main supporting frame of the machine by means of a guide and guide block, which guide the motion of the tool holder in one sense, and by two master cams which guide the tool holder in a second sense. The cam and guide and the guide block operate to constrain the holder, which is mechanically oscillated from a source of power, to move so that the edge of the tool shaves a working surface which has a shape corresponding to the shape of the cam. The tool holder is oscillated back and forth and may be provided with a cutting edge which takes a shave on the roughed gear blank when the tool holder is moved. By placing two cutting edges in adjacent position on the tool holder, a plurality of shaves may be simultaneously made when the tool holder is oscillated in one direction, in which case it is merely necessary to move the tool holder slightly further than when a single tool is used. In such case working surfaces are shaved on adjacent teeth by a single movement of the tool holder, after which the gear blank may be indexed and the operation repeated.

The more detailed objects and advantages of my invention, and the mode of operation thereof will be more fully set forth in the attached specification, in the claims and in the drawings, in which Fig. 1 is a front elevation of a machine provided with a tool for cutting helical gears.

Fig. 2 is an elevation thereof partially in section with the movable tool holder removed.

Fig. 3 is a central vertical transverse section through the tool holder and the support therefor.

Fig. 4 is a front sectional elevation on line 4—4 of Fig. 2 showing the driving mechanism by means of which the tool holder is oscillated.

Fig. 5 is a section on the line 5—5 of Fig. 3 taken through the cam, part of which is broken away, showing the tool holder in a central position.

Fig. 6 is a section corresponding to Fig. 5, showing the tool holder oscillated to an extreme position.

Fig. 7 is a rear elevation of the upper part of the machine, showing the indexing mechanism.

Fig. 8 is a detail showing the positive stop of the indexing mechanism.

Fig. 9 is a side view of Fig. 8.

Fig. 10 is an end elevation of part of the indexing mechanism.

Fig. 11 is a detail of a link of the indexing mechanism.

Fig. 12 is a front view in elevation showing the helical gear mounted in position.

Fig. 13 is a detail view of a spur gear and tool.

Fig. 14 is an enlarged view of the cutting portion of a tool for cutting herring-bone gears.

Fig. 15 is a bottom view of the cutter shown in Fig. 14.

Fig. 23 is a detail of the slide block.

Figure 1:
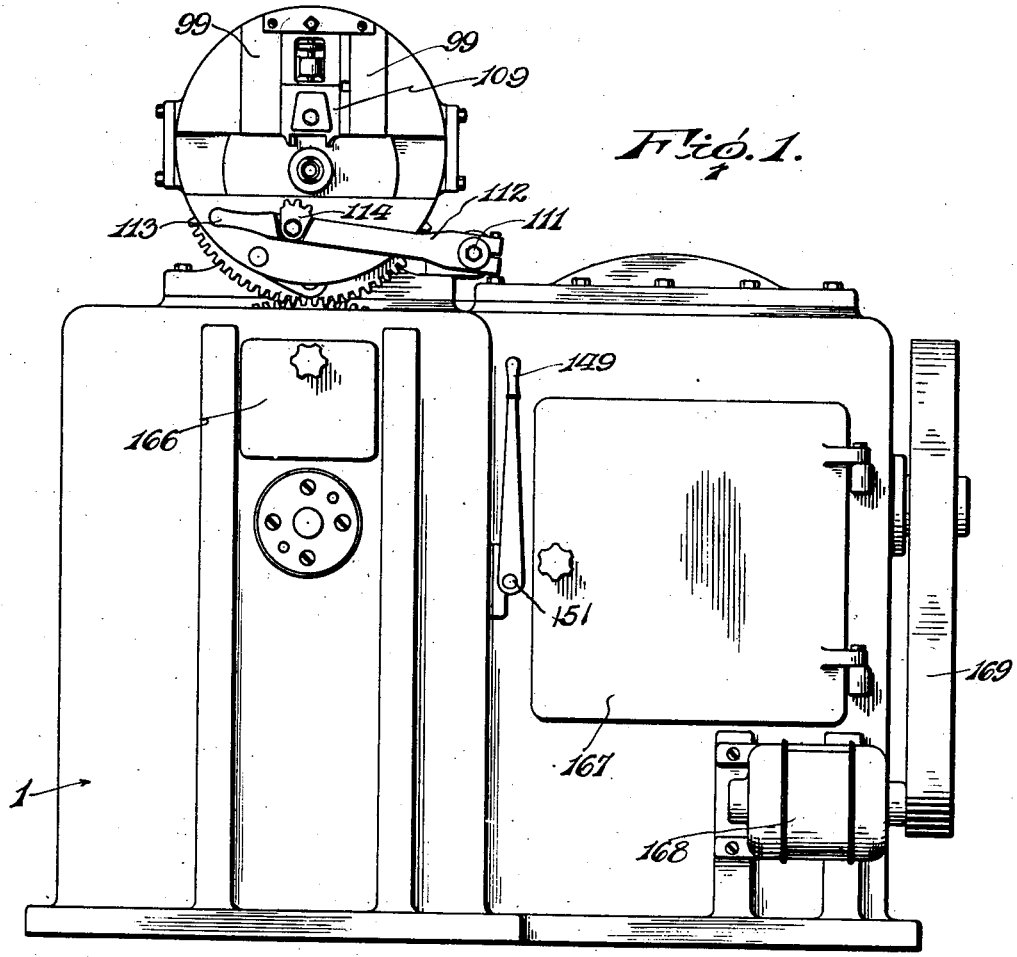

Referring more particularly to the drawings by reference numerals, 1 indicates the main base supporting casting upon which is mounted an upper support block 2 by means of bolts 3. The upper support block is provided with two upwardly extending portions 4 and 5 which hold the split adjustable bearing member 6 and bearing member 7 respectively. Bearing member 7 is provided with an internal bore 8 and a similar internal bore is provided in bearing member 6 so as to rotably mount therein a spindle 9 which is held against endwise movement by the lock nuts 10 and 11 co-operating with the fastening nut 12 and washer 13 respectively. These lock nuts 10 and 11 are threaded on the threads 14, and the left-hand end of the spindle 9 is made slightly larger than the right-hand end as seen in Fig. 3, so that the spindle may be inserted from the left within the bearing members. The bearing member 7 has oscillatably mounted thereon a segmental gear 15 and a similar segmental gear 16 is mounted by means of a bearing cap 17 on the supporting member 6'. Rigidly attached to bearing member 7 by means of removable pins or bolts 18 is a cam 19 and a similar cam 20 is rigidly attached to the supporting member 6'. These cams are of a shape which will be more fully hereinafter described. It will therefore be seen by referring to Fig. 2 that the cams, upper support block and bearing members 6, 6' and 7 are all rigidly attached together, and serve as the main support for the spindle and for the gear segments.

Referring now to Fig. 3, it will be seen that the right-hand end of the spindle 9 is provided with a smaller cylindrical bearing surface 21 upon which is freely mounted a slide block 22 which is provided with an internal bore 23 and upper and lower bearing surfaces 24 and 25. The cylindrical bore 23 may be positioned midway between the upper and lower bearing surfaces, but is preferably closer to one than to the other so that the slide block may be inverted to permit gears of two different base circle diameters to be cut. When a master cam surface is used having a different base circle than cam 19, and is substituted for the cam 19 which is readily detached from the upper support block, it is necessary to use a different slide block, or to invert the slide block shown so that the tool holder will be in the proper position in relation to the gear to be cut. The guides 31 and 32 at the left-hand end of the spindle are likewise replaceable. When the diameter of the left-hand end of the spindle 9 is equal to the base circle of the gear to be cut by the machine, the guides 31 and 32 will roll without sliding on the spindle as the tool holder is oscillated. Where a number of gears having different base circles are to be cut on the same machine, a sliding action together with the rolling motion will obtain between the spindle and the guides when the base circle of the gear does not correspond to the diameter of the spindle at the point where it is mounted in the guides.

The bearing surfaces 24 and 25 operate in straight parallel guides 26 and 27, which are rigidly attached by means of removable bolts and pins 28 to the right-hand end 29 of the tool holder 30. The left-hand end of the spindle 9, see Fig. 3, is mounted so as to be freely movable in the straight parallel guides 31 and 32 attached to the left-hand end 33 of the movable tool holder, thus limiting the movement of the tool holder in one sense, in its oscillation.

Fixed to the left-hand end of the spindle 9, see Fig. 3, is a brake drum 34, a toothed stop wheel 35, a ratchet wheel 36, and a spacing disk 37, the functions of which will be later set forth. The brake drum 34 is rigid with the spindle and parts 35, 36 and 37 are attached to the brake drum by through bolts 38, threaded therein. A threaded plug member 42 is provided with internal threads which engage with external threads on a bolt 43. The member 42 is provided with a conical portion 44 which co-operates with a conical seat in the end of the spindle. The bolt 43 extends entirely through the spindle 9 and projects slightly from the left-hand end thereof where it is held by a nut 40 and washer 41, thus holding the plug member 42 fixed to the spindle. A spacing member 45 is slidably mounted on the end of member 42 and fits neatly in and is adapted to abut against the end of the cylindrical bearing member 21. A clamp member 46 is fitted neatly on the end of member 42, and the spacing member 45 and clamp member 46 are adapted to rigidly hold a roughed gear blank therebetween on the member 42 affixed to the spindle 9. The roughed gear blank is held rigidly in position when the nut 47 is tightened, it being understood that nut 47 is threaded on the threads provided on the end of member 42.

Figure 16:
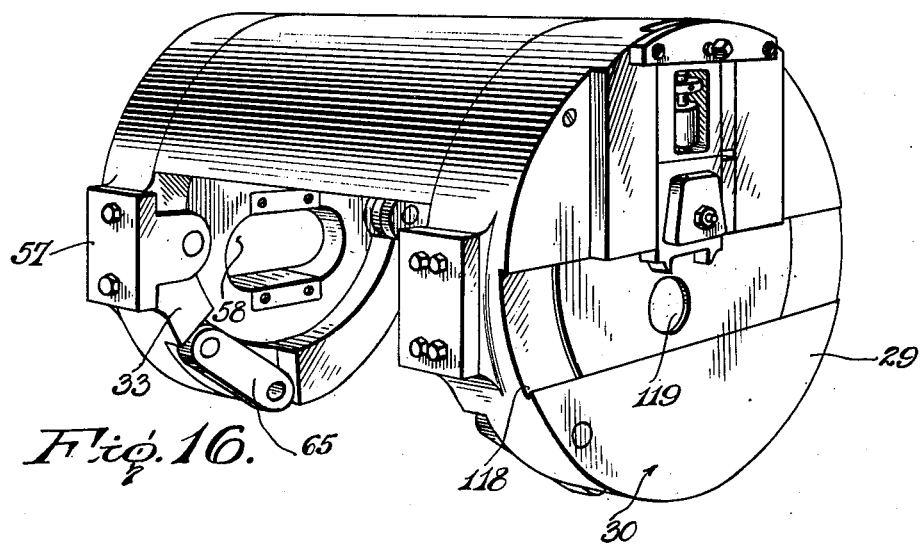
Fig. 16 is a perspective view of the movable tool holder.

The movable tool holder 30 is provided with the two end portions 29 and 33, which are rigidly attached to a curved spacing casting 48 by means of bolts 49 and 50. It will be seen, referring to Fig. 16, that the tool holder is of a general cylindrical or drum shape with the lower portion of the curved spacing casting 48 omitted to permit the tool holder to be mounted on the upper support block and on the spindle. The end 29 of the tool holder is provided with two opposed rollers 51 and 52 which bear upon the cam 19 at all times. Roller 51 is mounted so as to be movable upon a pin 53, which is fixed in a bracket 54, bolted on the side of the end 29 of the tool holder by means of bolts 55. Roller 52 is similarly mounted upon the opposite side of the tool holder by means of a similar bracket 56. Similar rollers are provided on the opposite end 33 of the tool holder by means of similar brackets 57. It will therefore be seen that the housing is mounted upon the upper support block 2 and upon the spindle 9 by means of the slide block 22, the guides 26 and 27 for the slide block, the guides 31 and 32 for the opposite end of the spindle 9, the two cams 19 and 20 and the rollers mounted in the tool holder. The cams control the movement of the tool holder in one sense, as the tool holder is oscillated and the slides or guides at the opposite ends of the tool holder control the movement thereof in a second sense, and together cause the tool holder to move when it is oscillated so that all points of the tool holder describe curves of the same shape. If therefore the curves on the master cam surfaces are involutes, substantially every point of the tool holder on base circle tangent lines will describe involutes as the tool holder is moved. Every point on the cutting edges of the tool, which are positioned on base circle tangent lines, will therefore describe involute lines.

The end 33 of the tool holder is provided with an elongated hole 58 and a similar elongated hole 59 is provided in the end 29 of the tool holder. This is necessary to permit the end of the spindle 9 to operate therein as the tool holder is oscillated. Referring to Figs. 5 and 6 it will be seen that when the tool holder is moved from its central position, as shown in Fig. 5 and in Fig. 1, to the position shown in Fig. 6 where the tool holder is approximately at the end of its movement, the tool holder will move in relation to the axis of the spindle 9 since the tool holder is not moving about the spindle axis. Such a movement is permitted by means of a slide block 22, sliding in the guide members on the tool holder and pivoting on the cylindrical bearing member 21 of the spindle.

A pivot pin 60, is fixed on the end 29 of the tool holder and pivotably mounted on this pin is a link 61 which is inserted in a cut away portion 62 on the inside of end member 29, so that the inner face of the end 29 and of the link 61 will be flush with the surface of the segment 15. The segment 15 is provided with a pin 63, rigidly attached thereto, which co-operates with the hole 64 in the link 61. The gear segment 15 is oscillated back and forth about the axis of the spindle 9 in a manner to be later described, and such movement is transmitted to the end 29 of the tool holder by means of the link connection just described. A similar link 65 is attached by means of similar pins to the gear segment 16 and the end 33 of the tool holder so that both ends of the tool holder are positively driven in synchronism.

Figure 22:
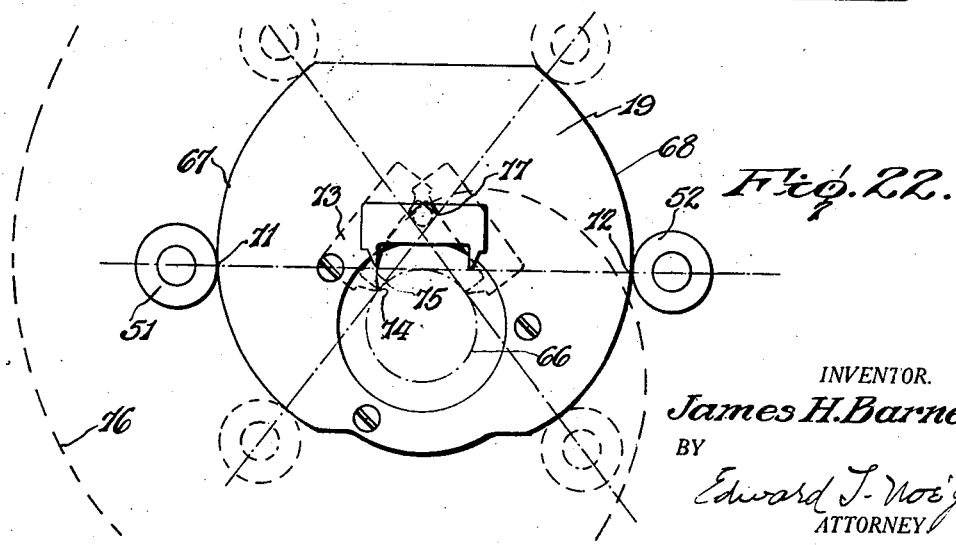
Fig. 22 is a diagrammatic view showing the master cam and the co-operating rollers.
Figure 21:
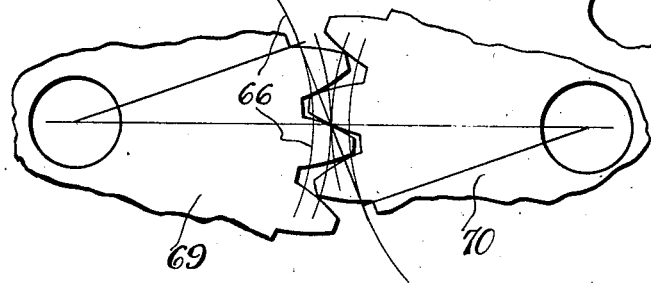
Fig. 21 is an end view of two intermeshing involute spur gears.

The cam 19 is designed in a peculiar manner which will now be described. Referring particularly to Figs. 21 and 22, the numeral 66 indicates the base circle from which the two involute surfaces 67 and 68 of the cam 19 are generated. The base circle 66 is of the same diameter as of the base circle of the gear to be cut, as for example the two spur gears 69 and 70 shown in Fig. 21. Taking a line from the point 71 to the point 72 in Fig. 22 which corresponds to the points of contact of the two rollers 51 and 52, and maintaining this line at all times tangent to the base circle 66 and also maintaining the length of this line 71—72 constant, the cam surfaces 67 and 68 will be described by rocking the line 71—72 in conjugate relation to the base circle. It will be evident from the manner in which the cam is generated that the surfaces 67 and 68 are involutes and also that the distance across the cam is constant. Since opposite sides of the cam have complementary curvature, resulting in a constant distance across the cam, the rollers 51 and 52 will bear on the surfaces 67 and 68 at all points along the path of movement when the tool holder, to which the rollers are attached, is oscillated. The surfaces 67 and 68 are fixed in position since the cam is fixed in the upper support block. The tool holder will therefore be moved as shown in Figs. 5 and 6, and be guided in one sense by the cam. The tool holder is also guided in a second sense on the upper support block and on the spindle 9, by the slide block 22. The distance between the upper bearing surface 24 and lower bearing surface 25 of the slide block may be any desired amount and it will be understood that since the slide block 22 is freely pivoted on the spindle 9 and slidable in the end of the tool holder, the tool holder is free to move as controlled by the cam, but is also controlled by the slide block so that the axes of the rollers 51 and 52 are maintained in bearing relation with the opposite sides of the cam. The tool 73, see Fig. 22, is fixed in the tool holder when a cut is made; and the cutting edge 74 of this tool will describe an involute surface indicated at 75, as the tool holder is moved from the position corresponding to Fig. 5 to that corresponding to Fig. 6. The involute surface 75 is of the same proportionate shape, that is involute, as the surface 67, but the size of the involute 67 is a great deal larger than that of the surface generated by the tool and consequently any inaccuracies in the shape of the came surface 67 will be negligible as appearing on the surface 75 generated by the tool. The involute line 75 is continued as indicated at 76 to more clearly illustrate the fact that the surfaces are of the same proportionate shape. It will now be seen that when the tool holder is oscillated the cutting edge 74 of the tool will shave an involute surface corresponding with the surface 75 on a tooth of a roughed gear blank which is held in a stationary position on the spindle 9. When the tool holder is moved in the opposite direction, a second cutting edge 77 will be moved as indicated in the dotted lines in Fig. 22, to shave a second involute surface on a tooth of the roughed gear blank removed from the first tooth cut. By suitably indexing the roughed gear blank in a manner which will be hereinafter described, all of the working surfaces of the blank may be shaved so that each shave is taken in the direction of roll or in other words in the direction in which the surface rolls and slides on a mating gear tooth surface. In the embodiment illustrated in Fig. 22, in which a spur gear is made, these shaves are taken from the end inwardly towards the root of the tooth. This is likewise true when the machine cuts helical surfaces. A smooth involute surface is generated on the tooth and any inequalities in the surface which would have been caused by cutting the working surface of the tooth across the tooth, or in other words parallel with the axis of the gear, are entirely eliminated.

Figures 17, 18:
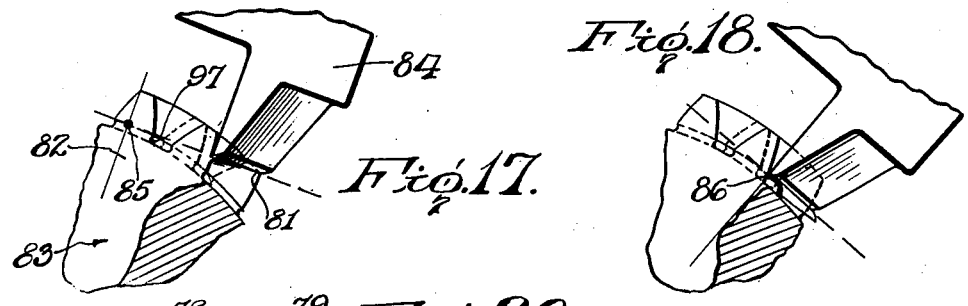
Figs. 17, 18 and 19 are details showing the manner in which a shave is made on a helical gear.
Figure 20:
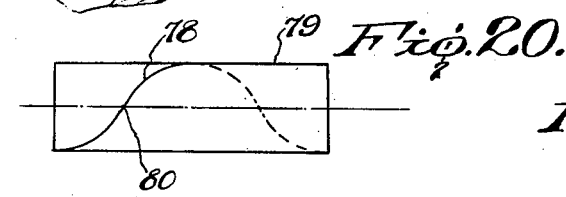
Fig. 20 is a diagrammatic view of a helix described on cylinder.
Figure 19:
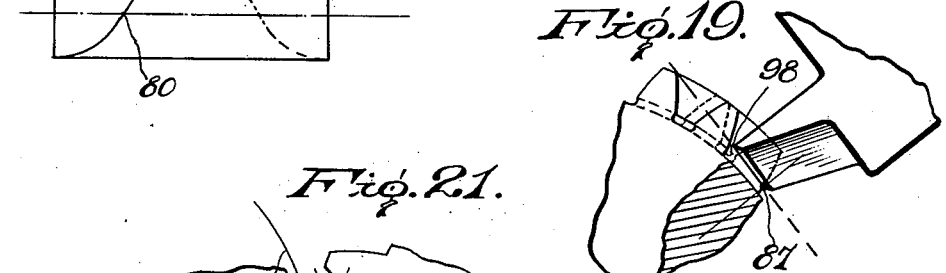

When a spur gear is shaved, the cutting edge of the tool is positioned stationary parallel to the axis of the gear. I have found that a helical involute gear may be shaved from the end inwardly towards the root of the teeth, by having the cutting edge of the tool angularly related to the axis of the gear being cut. Referring now to Figs. 17 to 20 inclusive in particular, and also to Fig. 12, there is shown the method of shaving a helical involute gear which will now be described. In Fig. 20, the curved line 78 indicates the curve of a helix which may be generated by wrapping a triangular piece of paper about the base cylinder 79. The base cylinder 79 has the same diameter as the base circle of the helical gear blank to be cut and this base circle also corresponds to the base circle of the involute. The angle of the helical line 78 at the central point 80 corresponds to the angle which the cutting edge 81 makes to the face 82 of the helical gear 83, it being understood that the tool indicated at 84 in Fig. 17 is held on the tool holder so that each point along the edge of the cutting edge 81 is rocked about the base circle in the same manner as the tool is rocked about the base circle in the illustration in Fig. 22. Every point along the cutting edge 81 of the tool on Fig. 17 will therefore describe an involute line on the working surface of the tooth. Due to the angular relation of the cutting edge 81, the various points along the tool in describing involute lines will collectively generate the helical working surface on the tooth. Fig. 17 shows the relative position of the tool and the tooth and the numeral 85 indicates the point about which the cutting edge 81 is momentarily moved. This point 85 is of course positioned on the base circle since the tool 84 in effect operates in conjugative relation with this imaginary circle. If the cut is continued, the point 85 will assume the position shown at 86 in Fig. 18, corresponding to a position where the complete working surface has been fully shaved at one end only of the tooth. The tool is moved still farther so that the point 86 assumes the new position 87 shown in Fig. 19, during which the unfinished portion of the working surface is completely shaved.

Referring now to Fig. 12, if a plurality of cutting edges are placed adjacent to each other as shown at 88 and 89, when the tool holder which moves in a clock-wise direction as seen in this figure, the tool edge 88 will shave a complete working surface on the tooth 90 and at the same time the tool edge 89 will be shaving a working surface on an adjacent tooth 91. In such a case as this it is merely necessary to move the tool holder a greater amount than would be necessary in the shaving of a single tooth. A shave is started by the cutting edge 89 after the cutting edge 88 has partially completed its cut. After the cutting edge 88 has fully completed its cut, the cutting edge 89 continues to shave on its corresponding tooth while the cutting edge 88 is moved out of engagement and entirely free from the tooth it has shaved. This will be more evident by referring to Figs. 17, 18 and 19, and noticing the path of movement of the point about which the tool holder is instantaneously rocking. It has been proved beyond all doubt in actual practice, that the working surface generated by positioning the cutting edge of the tool as previously indicated, is a perfect helix.

Figs. 14 and 15 show detailed views of a cutter for the shaving of helical involute herring-bone gears. Two cutting edges 92 and 93 are each of a general wedge shape as shown, and the tool 94 described may either consist of a single part or be made in two halves 95 and 96 which may be held in their proper relationship in the tool holder.

Regardless of the particular type of gear to be cut, the roughed gear blank is first made by roughing out the teeth in any desired manner, as for example by means of a hob. This hob is preferably designed so as to slightly undercut the tooth below the working surface of the tooth, as indicated at 97 in Fig. 17. This undercut is just sufficient, or very slightly in excess of that necessary to cause a perfectly smooth working surface after the shave has been taken, as indicated at 98 in Fig. 19. The undercut has been shown slightly exaggerated for purposes of illustration, as in actual practice it is sufficient to shave only a few thousandths of an inch from the gear teeth.

The master cam surfaces 67 and 68 in the embodiment shown are perfect involutes, but it is quite possible and may be desirable to modify the shape of the cam surfaces, while still maintaining the distance across the cam constant so that the rollers 51 and 52 will roll thereon at all times. The machine is, of course, adapted for other uses than merely cutting helical, spur, or herring-bone gears and may be modified to cut working surfaces on other power transmitting bodies such as segments, cams, racks, etc. The provision of the rollers 51 and 52 of comparatively large size where the force is transmitted, permits a large bearing surface and a rolling motion, instead of a sliding motion which would be necessary if the tool holder bore directly upon the cam.

The end of the tool holder 29 is provided with two parallel tool holding guides 99, between which is held the tools 84, 109 and 110. A bolt 100 and a plate clamp 101 serve to hold the tool fixed to the end of the tool holder between the two tool guides 99. Adjustment of the tool 84 toward and away from the gear blank is permitted by means of an adjustable threaded member 102, which is threaded in a projection 103 integral with the end of the tool holder. The lower end of the threaded member 102 is adapted to bear upon the upper surface 104 of the tool positioning block 105 which is provided with a projection 106 fitting in a corresponding depression in the upper end of the tool proper 84. The tool 84 is provided with a cut away portion 107' so that the bolt 100 will not interfere with the adjustment of the tool. The tool positioner 105 may be locked in position by a seat screw 107 threaded in a plate 108 rigidly attached to the end of the tool holder. The vertical adjustment of the tool towards and from the gear to be cut is permitted to allow for sharpening of the wedge shaped cutting edges. The tool itself is very easily sharpened since the edges are usually perfectly straight and at a known angle to the front face of the tool. The tool 84 shown in Fig. 12, which is provided with four cutting edges so that two working surfaces are shaved on adjacent gear teeth for each movement of the tool holder, may be replaced by the tool 109 shown in Fig. 1, or may be replaced by a spur gear cutter indicated at 110 in Fig. 13.

Mounted upon a pin 111, fixed on the upper end of the support block, is an arm 112 which is freely movable about the axis of the pin 111 so that the handle 113 on the end of this arm may be grasped by the operator after the roughed gear blank has been placed on the spindle 9. The lever is moved so as to bring the segmental positioner 114 rigidly attached to the arm by bolt 115, into engagement with the teeth of the roughed gear blank. The segmental positioner 114 is so mounted upon the arm 112 that when the teeth thereon engage with the teeth of the roughed gear blank, the blank is properly located in relation to the tool so that the tool will take a shave of the proper thickness. After the segmental positioner 114 has been moved into engagement with the teeth of the gear blank, the gear blank is then held in place on the spindle by tightening up on the clamp nut 47. The arm 112 is then moved so that it again assumes its inactive position shown in Fig. 12.

In order to prevent any of the cuttings resulting from the shaving operations from lodging in any of the internal mechanism, a thin slide 116 is mounted in slide guides 117 in the end of the tool holder. These guides are at an angle as shown at 118 so as to retain the slide 116 therein. The slide is provided with a central hole 119 which loosely fits upon the cylindrical surface 120 of the spacing member 45, see Fig. 3. The slide is adapted to move in its guides when the tool holder is oscillated, the slide meanwhile pivoting about the axis of the spindle 9.

The mechanism for oscillating the tool holding means about the cam so as to cause the tool to take a shave on a tooth will now be described. The tool holder is oscillated, as previously mentioned, by reason of its link connections with the two segmental gears 15 and 16. These gears mesh with two gear segments 121 and 122 respectively, which are fixed to a shaft 123 journaled in bearings 124 and 125 in the ends of the main base supporting housing. The gear segments 121 and 122 are interconnected near the upper ends thereof by a through bolt 126 and spacing member 127. The member 127 is provided with a bearing surface 128 to which is attached the connecting rod 129 by means of the bearing halves 130 and 131. The connecting rod 129 is attached at its opposite end by means of a second pair of bearing members 132 and 133 to a pin 134 projecting from the face of the disk 135. The pin 134 is adjustable toward and away from the center of the disk 135 by means of suitable guides to vary the amount of movement of the tool holder. Disk 135 is mounted on a central shaft 136 to which is also rigidly attached a worm wheel 137 which mesh with the teeth of the worm 138 mounted on shaft 139, which is journaled in bearings 140 and 141 on a support 142 mounted on the main base supporting housing. At the left end of the worm shaft 139, as seen in Fig. 4, is provided a collar 143 which is mounted in a groove in the shaft, to be thus fixed against end-wise movement therein; and at the right-hand end of the shaft 139 is provided a clutch member 144 adapted to co-operate with a female clutch member 145 on the stub shaft 146 which is journaled in the bearings 147 in the housing. To the stub shaft 146 is attached by means of a key or similar attaching device, a fly-wheel 148 which is rotated by suitable source of power.

The clutch member 144 is mounted upon the shaft 139 so as to move endwise therewith. When the clutch member 144 and the entire worm shaft is moved to the right so as to engage with the clutch member 145 the worm 138 rotates the worm wheel 137 and disk 135 and causes an oscillatory movement of the gear segments to oscillate the tool holder.

The clutch members are shown engaged, in Fig. 4, and may be disengaged by a clockwise movement of the hand lever 149, see Fig. 1, which operates a lever 150 fixed on a shaft 151. The movement of lever 150 operates to pivot the link 152 about a fixed axis 153 and a cam slot 154 in link 152 cams the collar 143 by means of a pin 155 fixed on the collar. Such movement operates upon the entire worm shaft to cause the clutch member 144 to move to the left in Fig. 4, and disengage the shaft 139 and stop the rotation of the worm and worm wheel.

The movement of lever 150 to disengage the power drive is possible at any time, due to the slot 156 in the link 157, which is pivoted at 158 to a link 159 mounted on a fixed pivot 160. An automatic stop is provided by means of which a spring operates to move link 157 upwardly when possible, and such motion is transmitted to a pin 161 fixed on the lever 150 to stop the driving mechanism. The spring urges the link 157 upwardly and forces a vertically extending pin 162 into engagement with a depression in a ring 163 which is fixed to a spindle 9. The pin 162 is vertically movable in a hole 164 in the upper support block and is pivoted at its lower end by a pivot 165 to the link 159. It will be obvious that it is necessary for the single depression in ring 163 to be rotated through 360° before the pin 162 is permitted to again enter the depression and stop the driving mechanism automatically after cutting a complete gear.

An inspection plate 166 is provided on the front of the main base supporting housing and a main door 167 is likewise provided for access to the internal drive mechanism. The motor 168 is adapted to drive the wheel 148 by means of a belt 169.

It is necessary to index the gear blank supporting means step by step automatically and such mechanism will now be described. Pivotally mounted upon a bolt 170 fixed to the rear of the main supporting housing is an arm 171 which is provided with a roller 172 projecting therefrom towards the end 33 of the tool holder. Two cams 173 and 174 are fixed to the end of the tool holder by means of screws 175 and provide therebetween a passageway for the roller 172 so as to cam the arm 171, back and forth positively in both directions as the tool holder oscillates. The arm 171 is pivoted to a link 176 which is pivotally connected at 177 to a reciprocating slide 178 slidably mounted upon the fixed pins 179 and 180 which are mounted in the back plate 181. The back plate 181 is rigidly attached to the rear of the main supporting housing, as shown in Fig. 7. A plurality of elongated slots 182 are provided in the slide 178 and co-operate with the pins 179 and 180 to slidably mount the member 178. A pawl 183 is pivotally attached at 184 to the slide 178 and a spring 185 is positioned in a recess in the slide 178 to urge the end of the pawl upwardly. The pawl is adapted to engage with the teeth on the ratchet wheel 36 so that the ratchet wheel, which is rigidly attached to the spindle 9 and to the roughed gear blank, will be moved step by step as the arm 171 is oscillated back and forth. The proper number of teeth are provided on the ratchet wheel 36 so that the gear being cut will be moved the distance of one tooth if a cutter corresponding to that shown in Fig. 1 is used. In case a cutter corresponding to that shown in Fig. 12 is used the gear blank will be indexed any amount equivalent to two teeth for each complete double oscillation of the tool holder. In order to brake the movement of the spindle and the parts attached thereto, in indexing, a friction brake member 186 is provided for co-operation with the brake-drum 34, and the brake-member 186 is moved upwardly by means of a stud 187 attached thereto. The lower end of the stud 187 is cammed upwardly by means of a cam plate 188. Cam plate 188 is pivotally mounted on a bolt 189 fixed to the end of the main supporting housing, a recess 190 being provided in the back plate 181 for the reception of the cam 188. The pivot pin 191 pivotally connects a slide link 192 to the cam 188. The slide link 192 is provided with a slot 193 which encloses a bearing member 194 fixed in position on the supporting housing so that the slotted end of the slide link is free to move back and forth as controlled by the two operating cams 195 and 196, which are attached to the shaft 136 of the worm wheel 137. Cam 196 is provided with a projection 197 and cam 195 is provided with a depression 198 which cooperate with two rollers 199 and 200 pivoted to and projecting from the slide link 192, so that the slide link will be positively moved back and forth at the proper time to apply the friction brake.

In order to positively stop the rotation of the spindle 9 and its associated parts, a stop wheel 35 is provided with pointed teeth 201 which are pointed in an opposite sense to the teeth of the ratchet wheel 36. A stop 202 is adapted to be moved into the path of a tooth of the wheel 35 at the proper instant after the spindle 9 has been rotated the proper amount. This stop 202 is pivotally mounted at 203 upon a lug 204 which is fixed to the upper side of the end of the slide member 178.

The index plate 37 is rigidly attached to the spindle 9 and is provided with a series of depressions 205 having angularly related sides to provide substantially V-shaped depressions. Two opposed locking dogs 206 and 207 are pivotally mounted upon the fixed pins 179 and 180 respectively and are provided with substantially V-shaped projections 208 and 209 respectively which exactly fit in the depressions 205 on opposite sides of the index plate. The locking dogs are connected by means of links 210 and 211 to the cam 188. As the cam 188 is oscillated by the slide link 192 the dogs are pivoted on their axes so as to cause the projections 208 and 209 to engage or disengage depressions 205. The index plate 37 may be very accurately made and of large size and the locking dogs operating on opposite sides of the plate provide a means for exactly positioning the spindle 9 and the roughed gear blank in the various steps of their movement. The angularly related sides of the depressions 205 and of the projections on the dogs, cooperate to move the index plate slightly in one direction or the other as the dogs are engaged, if the operating pawl has not exactly moved the spindle the required amount or if the stop 202 permits too great a movement of the spindle or of the roughed gear blank as they are indexed. Positioning the opposed locking dogs slightly below the center of the index plate provides a substantially horizontal contact between the dogs and the index plate, thus preventing any tendency of the dogs being forced out of their corresponding depressions due to a strain occurring in the mechanism when a shave is being made on a gear tooth.

In Fig. 7 the dogs have just been engaged with the depressions in the index plate. The tool holder is about to be moved in the direction of the arrow "A" and the stop 202 is about to be moved to the left as seen in Fig. 8 so as to disengage the teeth on the stop-wheel 35. The cams 195 and 196 are rotated in the direction of the arrow "B" at all times and the locking dogs will therefore be maintained engaged with the depressions on the index plate until the tool holder is moved counterclockwise to the limit of its movement and nearly returned to the position shown in Fig. 7, at which time the projection 197 and the depression 198 on these cams will cause a clock-wise movement of the cam 198 which will operate to release the locking dogs. The cam plates 173 and 174 will then operate in conjunction with the cam roller 172 to move the arm 171 to the right to the position indicated in Fig. 7 which will first rotate the ratchet wheel 36 and then cause the stop 202 to move into engagement with the stop wheel. Just before the stop 202 is moved into engagement with wheel 35 the friction brake 186 is applied by means of the cam 188. It will therefore be understood that the step by step movements of the spindle 9 and the roughed gear blank are extremely accurate and accomplished without undue strain upon the mechanism.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In a machine for cutting curved surfaces in the direction of roll of said surfaces, in combination, a support, tool holding means provided with a device for holding a cutting tool thereon, means on said support for holding a blank to be finished and mechanism for relatively moving said two means so that a cut is made on said blank, said mechanism including a master cam for relatively guiding said means, said cam having the same shape as the surface to be cut on said blank, and a guide and guide member, said guide, guide member and cam governing the relative movement of said means.

2. In a machine for cutting helical involute gears, in combination, a support, gear holding means and tool holding means mounted thereon, said gear holding means being adapted to hold a helical gear blank thereon, a shaving tool fixed in said tool holding means while a shave is being made, and mechanism for relatively moving said two means so that the tool takes a shave on a working surface of a tooth of said gear substantially in the direction of roll of said surface to cut a helical surface thereon.

3. In a machine for cutting helical gears, in combination, a support, gear holding means and tool holding means mounted thereon, said gear holding means being adapted to hold a helical gear blank thereon, a straight edged tool mounted in said tool holding means so that the straight edge thereof is angularly related to the axis of said gear blank, and mechanism for relatively moving said two means so that the tool takes a shave on a working surface of a tooth of said gear blank substantially in the direction of roll of said surface.

4. In a machine for finishing helical substantially involute gears, in combination, a support, gear holding means and tool holding means mounted thereon, a device for holding a roughed helical gear blank on said gear holding means, a straight edged tool mounted on said tool holding means so that the straight edge thereof and the axis of the gear blank are not in a common plane and are angularly related in accordance with the helical pitch angle of the blank, and mechanism for relatively moving said two means so that the tool cuts a helical substantially involute working surface on a tooth of said gear blank from the end inwardly to the root of the tooth in a single operation.

5. In a machine for finishing helical involute gear teeth, in combination, a support, means on said support for holding a roughed helical gear blank thereon, a tool holder oscillatably mounted on said support, a tool fixed in said tool holding means, said tool having a wedge shaped cutting edge angularly related to the axis of said gear blank, and means for moving said tool holder so that the edge of the tool shaves a working surface on a tooth of said blank so that the shave is made from the end inwardly toward the root of the tooth.

6. In a machine for cutting curved surfaces of non-circular form, in combination, a support, tool holding means provided with a device for holding a cutting tool thereon, means on said support for holding a blank to be finished, and mechanism for relatively moving said two means so that the one moves while the other is maintained stationary, said mechanism including a master cam surface and an oscillatory guide and guide member for relatively guiding said means.

7. In a machine for cutting curved surfaces of non-circular form, in combination, a support, tool holding means provided with a device for holding a cutting tool thereon, means on said support for holding a blank to be finished, and mechanism for relatively moving said two means so that the one moves in a curved path while the other is maintained stationary, said mechanism including a master cam surface for relatively guiding said means, said master cam surface being provided with a surface having the shape of the curve of said curved path, and rollers having axes fixed in relation to one of said means and to each other for cooperating with opposite sides of said master cam surface.

8. In a machine for cutting curved surfaces of non-circular form, in combination, a support, tool holding means provided with a device for holding a cutting tool thereon, means on said support for holding a blank to be finished, and mechanism for relatively moving said two means so that the one moves in a curved path while the other is maintained stationary, said mechanism including a master cam surface for relatively guiding said means, said master cam surface being provided with a surface having the shape of the curve of said curved path, said mechanism also including a guide in one of said means co-operating with a member guided therein, said member having an axis fixed in relation to the other of said means.

9. In a machine for cutting curved surfaces, in combination, a support, tool holding means provided with a device for holding a cutting tool thereon, fixed in position while a cut is being made, means on said support for holding a blank to be finished, and mechanism for relatively moving said two means including a master cam surface for relatively guiding said means, said master cam surface being provided with a surface having the shape of the curve of said curved path, and a slide block oscillatably mounted in relation to one of said means and sliding in the other of said means.

10. In a machine for cutting curved surfaces of non-circular form, in combination, a support, tool holding means provided with a device for holding a cutting tool thereon, means on said support for holding a blank to be finished, and mechanism for relatively moving said two means so that the one moves in a curved path while the other is maintained stationary, said mechanism including a master cam surface for relatively guiding said means, said master cam surface being provided with a surface having the shape of the curve of said curved path, a guide in one of said means co-operating with a member guided therein having an axis fixed in relation to the other of said means, and a roller having an axis fixed in relation to one of said means, co-operating with said master cam surface.

11. In a machine for cutting curved surfaces of non-circular form, in combination, a support, tool holding means provided with a device for holding a cutting tool thereon fixed in position while a cut is being made, means on said support for holding a blank to be finished, and mechanism for relatively moving said two means so that the one moves while the other is maintained stationary, said mechanism including a master cam surface for relatively guiding said means, said master cam surface being provided with a surface having the shape of the curve to be given to said blank, and a device for automatically relatively indexing said means after the cutting tool has finished taking a cut on said blank.

12. In a machine for cutting curved surfaces of non-circular form, in combination, a support, tool holding means provided with a device for holding a cutting tool in fixed position thereon, means on said support for holding a blank to be finished, and mechanism for relatively moving said two means so that one moves in a curved path while the other is maintained stationary, said mechanism including a master cam having opposite sides of complementary curvature so that the distance across said cam is constant, a device on one of said means for bearing on opposite sides of said master cam, and a guide in one of said means co-operating with a member guided therein having an axis fixed in relation to the other of said means.

13. In a machine for cutting curved surfaces, in combination, tool holding means provided with a device for holding a cutting tool in position thereon, means for holding a blank to be finished, mechanism for relatively moving said two means so that the one moves while the other is maintained stationary, a support for mounting said other means, said mechanism comprising a guide in one of said means and a guide block guided in said guide and oscillatably mounted on an axis fixed in relation to the other of said means and mechanism controlling the movement of said guide block in said guides as said one means is moved.

14. In a machine of the class described, in combination, tool holding means provided with a device for holding an edged cutting tool in position thereon, means for holding a blank to be finished, mechanism for relatively moving said two means so that one oscillates about the other, a support for mounting said other means, parallel straight guides in one of said means, a guide block guided therein and oscillatably mounted on said other means, and mechanism controlling the movement of said guide block in said guides as said one means oscillates.

15. In a gear cutting machine, in combination, a support, gear holding means mounted in said support and adapted to hold a roughed gear blank, a guide block pivoted to oscillate about an axis fixed in relation to said support, a tool holder, a tool therein, guides in said tool holder, said guide block being mounted in said guides to movably mount the tool holder thereon, mechanism for controlling the movement of said guide block in said guides as the tool holder is moved, and means for oscillating said tool holder to cause the tool to cut a working surface on a tooth of said gear blank in the direction of roll of said working surface.

16. In a gear cutting machine, in combination, a support, gear holding means mounted in said support and adapted to hold a roughed gear blank, guide blocks pivoted to oscillate about an axis fixed in relation to said support, a tool holder, a straight edged fixed tool therein, guides in said tool holder, said guide blocks being mounted in said guides to movably mount the tool holder thereon, mechanism for controlling the movement of said guide blocks in said guides as the tool holder is moved so as to cause every point in the edge of said tool to move in substantially involute paths, and means for oscillating said tool holder to cause the tool to cut a working surface on a tooth of said gear blank.

17. In a gear cutting machine, in combination, means for holding a roughed gear blank, tool holding means, a support for holding one of said means, a tool in said tool holding means, said tool having a plurality of parallel fixed cutting edges, and mechanism for relatively moving said means so that the cutting edges of the tool shave working surfaces on the teeth of said gear blank, each shave being made substantially in the direction of roll of the said working surfaces.

18. In a gear cutting machine, in combination, means for holding a roughed gear blank, tool holding means, a support for holding one of said means, a tool in said tool holding means, said tool having a plurality of parallel fixed cutting edges, and mechanism for relatively oscillating said means so that the cutting edges of the tool shave working surfaces on the teeth of said gear blank during each oscillation, each shave being made from the end inwardly toward the roots of the teeth.

19. In a machine for cutting curved surfaces of non-circular form, in combination, a support, tool holding means provided with a device for holding a cutting tool in fixed position thereon, means on said support for holding a blank to be finished, and mechanism for relatively moving said two means so that the one moves in a curved path while the other is maintained stationary, said mechanism including a master cam surface for relatively guiding said means, said master cam surface being provided with a surface having the shape of the curve of said curved path, said mechanism also comprising a pair of parallel guides in one of said means, and a roller adapted to roll in said guides, said roller having an axis fixed in relation to the other of said means.

20. In a machine for cutting curved surfaces of substantially involute form, in combination, a support, tool holding means provided with a device for holding a straight edged cutting tool in fixed position thereon, means on said support for holding a blank to be finished, and mechanism for relatively moving said two means so that the straight edge of said tool moves in a substantially involute path while the blank holding means is maintained stationary; said mechanism including a master cam relatively guiding said means, said cam having opposite sides of substantially involute shape described about a common base circle so that the distance across said cam is constant taken along lines tangent to said circle, said mechanism also including devices on one of said means bearing on opposite sides of said cam and a pair of parallel straight guides in one of said means co-operating with a guide block guided therein having an axis fixed in the other of said means.

21. In a machine for cutting curved surfaces of non-circular form, in combination, a support, tool holding means provided with a device for holding a cutting tool in position thereon, means on said support for holding a blank to be finished and mechanism for relatively moving said two means so that the one oscillates while the other is maintained stationary to shave a working surface on said blank, said mechanism including two cams for relatively guiding said means, said cams having a constant distance across the same and being provided with non-circular curves having the shape of the curve to be given to said blank, a pair of parallel guides in each end of said tool holding means, a guide block in one pair of guides, said guide block being mounted to oscillate about the central axis of the blank, a tool in said tool holding means, adjusting mechanism for moving said tool in said tool holding means toward or away from said blank, a groove in the outer face of said tool holding means and a thin slide block movable in said groove, pivoted on said blank holding means to oscillate about said axis, and a member mounted on said support for contacting with a surface of said blank to position said blank on said blank holding means.

22. In a gear cutting machine, in combination, a support, tool holding means provided with a device for holding a cutting tool thereon, means on said support for holding a roughed gear blank, and mechanism for relatively moving said two means so that the one moves in a curved path while the other is maintained stationary, said mechanism including a master cam for relatively guiding said means, said cam being provided with a surface having the shape of the curve of said curved path so that a tool held in said tool holding means takes a shave on said roughed gear blank substantially in the direction of roll of a tooth surface of said gear.

23. In a gear cutting machine, in combination, a support, tool holding means provided with a device for holding a cutting tool fixed thereon while a cut is being made, means on said support for holding a roughed gear blank and mechanism for relatively moving said two means so that the one is maintained stationary while the other moves in a substantially involute path to take a shave on the working surface of a tooth of said gear from the tip inwardly to the root thereof, said mechanism including a master cam for relatively guiding said means, said cam being provided with a substantially involute surface having the same base circle as the finished gear.

24. In a gear cutting machine, in combination, a support, tool holding means provided with a device for holding a cutting tool fixed thereon, means on said support for holding a roughed gear blank, and mechanism for relatively moving said two means so that the one is maintained stationary while each point of the other moves in substantially involute paths to take a shave on the working surface of a tooth of said gear from the tip inwardly to the root thereof, said mechanism including a master cam for relatively guiding said means, said cam being provided with a substantially involute surface having the same base circle as the finished gear blank, said cam being much larger than the base circle, and a roller on one of said means bearing on said cam.

25. In a gear cutting machine, in combination, a support, tool holding means provided with a device for holding a cutting tool fixed thereon, means on said support for holding a roughed gear blank, and mechanism for relatively moving said two means so that the one is maintained stationary while the other moves in a path to take a substantially involute shave on the working surface of a tooth of said gear from the tip inwardly to the root thereof, said mechanism including a master cam for relatively guiding said means, said cam being provided with a substantially involute surface having the same base circle as the finished gear blank, said cam being much larger than the base circle, and a roller on one of said means bearing on said cam, and a guide in one of said means co-operating with a member guided therein having an axis fixed in relation to the other of said means.

26. In a gear cutting machine, in combination, a support, a tool holding means oscillatably mounted on said support, gear holding means on said support for holding a roughed gear blank, and mechanism for moving said tool holding means along a substantially involute path comprising a cam fixed in relation to one of said means while a cut is being made and co-operating with a part fixed in relation to the other of said means, said cam having a substantially involute surface of much larger size than the tooth cut and having the same base circle diameter as the involute of the tooth cut so that a substantially involute surface is cut on said roughed gear blank.

27. In a gear cutting machine, in combination, a support, a tool holding means oscillatably mounted on said support, gear holding means on said support for holding a roughed gear blank, and mechanism for moving said tool holding means along a substantially involute path comprising a cam fixed in relation to one of said means while a cut is being made and co-operating with a part fixed in relation to the other of said means, said cam having a substantially involute surface so that a substantially involute surface is cut on said roughed gear blank, said mechanism also comprising a pair of parallel guides in said tool holding means co-operating with a member guided therein, said member being mounted for movement about an axis fixed in relation to said support.

28. In a gear cutting machine, in combination, a support, a tool holding means oscillatably mounted on said support, gear holding means on said support for holding a roughed gear blank, and mechanism for moving said tool holding means along a substantially involute path comprising a cam fixed in relation to one of said means while a cut is being made and co-operating with a part fixed in relation to the other of said means, said cam having a substantially involute surface of much larger size than the tooth cut and having the same base circle diameter as the involute of the tooth cut with the axis of the base circle coincident with the central axis of the gear to be cut so that a substantially involute surface is cut on said roughed gear blank, and means for automatically moving said gear holding means a predetermined amount step by step between cuts.

29. In a gear cutting machine, in combination, a support, a tool holding means oscillatably mounted on said support, gear holding means on said support for holding a roughed gear blank, and mechanism for moving said tool holding means along a substantially involute path comprising a cam fixed in relation to one of said means, said cam having opposite substantially involute surfaces, and a roller bearing on each side of said cam having axes fixed in relation to the other of said means and to each other, opposite points on said cam having complementary curves so that the rollers bear thereon at all times.

30. In a gear cutting machine, in combination, a support, a tool holding means oscillatably mounted on said support, gear holding means on said support for holding a roughed gear blank, and mechanism for moving said tool holding means along a substantially involute path comprising a cam fixed in relation to one of said means, said cam having opposite substantially involute surfaces, and a roller bearing on each side of said cam having axes fixed in relation to the other of said means, opposite points on said cam having complementary curves so that the rollers bear thereon at all times, said mechanism also including a pair of parallel guides in said tool holding means co-operating with a member guided therein, said member being mounted for movement about an axis fixed in relation to said support.

31. In a gear cutting machine, in combination, a tool holding means oscillatably mounted on said support, gear holding means on said support for holding a roughed gear blank, and mechanism for moving said tool holding means along a substantially involute path comprising a cam fixed in relation to one of said means, said cam having opposite involute surfaces having the same base circle, the distance across said cam on lines tangent to said base circle being constant and much larger than the diameter of the base circle, said mechanism also comprising a roller bearing on each side of said cam having axes fixed in relation to the other of said means, and a pair of parallel guides in said tool holding means co-operating with a member guided therein, said member being mounted for movement about an axis fixed in relation to said support, and power means for oscillating said gear holding means.

32. In a gear cutting machine, in combination, a support, tool holding means oscillatably mounted on said support, gear holding means on said support for holding a roughed gear blank and mechanism for moving said tool holding means comprising a plurality of spaced cams fixed in relation to one of said means, each of said cams having opposite involute surfaces having a common base circle, the distance across said cams on lines tangent to the base circle being constant and much larger than the diameter of the base circle, and a pair of rollers for each cam, the rollers of each cam bearing on opposite sides thereof, said rollers having axes fixed in relation to the other of said means, said mechanism also comprising a pair of parallel guides in each end of said tool holding means co-operating with members mounted for movement about alined axes fixed in relation to said support.

33. In a machine for cutting curved surfaces of non-circular form, in combination, a support, a cam fastened to said support, blank holding means and tool holding means, one of said means being mounted on said support and the other surrounding and restrained by said cam, and mechanism for operating said other means about said cam so as to cause a tool fixed in said tool holding means to cut a surface on said blank.

34. In a machine for finishing the operating surfaces of a rotating power transmitting blank, in combination, a support, a cam fastened to said support, said cam having opposite curved surfaces of complementary non-circular form so that the distance across said cam is constant, blank holding means and tool holding means, one of said means being mounted on said support and the other restrained by said cam, rollers on said other means bearing on opposite sides of said cam and mechanism for oscillating said other means about said cam so as to cause a tool fixed in said tool holding means to cut a curved surface on said blank.

35. In a machine for finishing the operating surfaces of a rotating power transmitting blank, in combination, a support, a cam fastened to said support, said cam having opposite curved surfaces of complementary non-circular form so that the distance across said cam is constant, blank holding means and tool holding means, one of said means being mounted on said support and the other restrained by said cam, rollers on said other means bearing on opposite sides of said cam, a slide in said one means and a slide block sliding therein, said slide block being mounted for movement about an axis fixed in relation to said support, and mechanism for oscillating said other means about said cam so as to cause a tool fixed in said tool holding means to cut a curved surface on said blank.

36. In a gear cutting machine, in combination, a support, a cam detachably fastened to said support, said cam having opposite involute surfaces described about a common base circle, the distance across said cam measured tangent to said base circle being constant and much larger than the diameter of said base circle, gear blank holding means and tool holding means, one of said means being mounted on said support and the other mounted in part on said cam, a slide in said mentioned other means and a slide block guided therein, said slide block having an axis fixed in relation to said support, and mechanism for oscillating said mentioned other means about said cam so as to cause a tool fixed in said tool holding means to cut a substantially involute surface on a tooth of said gear blank in a single operation.

37. In a device of the class described, in combination, a support, a plurality of spaced cams detachably fastened to said support, said cams having opposite complementary surfaces, the distance across said cams being substantially constant, gear blank holding means adjustably mounted in said support, tool holding means restrained by said cams, a gear segment pivoted on said support, drive means operating said segment and said tool holding means, means for automatically adjusting said gear blank holding means on said support to index the gear blank, said last named means being operated by said drive means, said drive means oscillating said segment so as to cause a tool in said tool holding means to take a shave on a tooth of said gear blank from the end inwardly towards the root of said tooth.

38. In a machine for finishing roughed gear blanks, in combination, a support, a cam fastened to said support, a tool holder surrounding and restrained by said cam and adapted to hold a tool fixed thereon while a cut is being made, means on said support for holding a roughed gear blank, and mechanism for oscillating said tool holding means about said cam so as to cause said tool to take a shave on a working surface of a tooth of said roughed gear blank in the direction of roll of said working surface.

39. In a machine for finishing roughed gear blanks, in combination, a support, a cam fastened to said support, said cam having opposed surfaces of substantially involute form having the same base circle as the involute of the gear to be cut, the distance between said opposed surfaces measured on lines tangent to said base circle being constant, a tool holder mounted about and restrained by said cam and adapted to hold a tool fixed thereon, means on said support for holding a roughed gear blank, and mechanism for oscillating said tool holding means about said cam so as to cause said tool to take a shave on a working surface of a tooth of said roughed gear blank in the direction of roll of said working surface.

40. In a machine for finishing roughed gear blanks, in combination, a support, a cam fastened to said support, said cam having opposed surfaces of substantially involute form having the same base circle diameter as the base circle diameter of the gear cut, the distance between said opposed surfaces measured on lines tangent to said base circle being constant, a tool holder mounted about and restrained by said cam and adapted to hold a tool fixed thereon, means on said support for holding a roughed gear blank, guides in said tool holder and a guide block having an axis fixed in relation to said support to take part of the strain on said tool holder when the cut is being made by the tool.

41. In a machine for finishing roughed gear blanks, in combination, a support, a cam fastened to said support, said cam having opposed surfaces of substantially involute form having the same base circle, the distance between said opposed surfaces measured on lines tangent to said base circle being constant, and much larger than the diameter of said base circle, a tool holder mounted about and restrained by said cam and adapted to hold a tool fixed thereon, means on said support for holding a roughed gear blank, guides in said tool holder and a guide block having an axis fixed in relation to said support to take part of the strain on said tool holder when the cut is being made by the tool, and rollers having axes fixed in said tool holder and bearing on opposite sides of said cam.

42. In a machine for finishing roughed gear blanks, in combination, a support, a cam fastened to said support, said cam having opposed surfaces of substantially involute form, having the same base circle, the distance between said opposed surfaces measured on lines tangent to said base circle being constant, a tool holder mounted restrained by said cam and adapted to hold a tool fixed thereon, means on said support for holding a roughed gear blank, and mechanism for oscillating said tool holding means about said cam so as to cause said tool to take a shave on a working surface of a tooth of said roughed gear blank in the direction of roll of said working surface, and means for automatically rotating said gear blank holding means a predetermined amount step by step between shaves to index said gear blank and for holding it stationary while the cut is being made.

43. In a machine for finishing roughed gear blanks, in combination, a support, a cam fastened to said support, a tool holder mounted about said cam and adapted to hold a tool fixed thereon, means on said support for holding a roughed gear blank, and mechanism for oscillating said tool holding means about said cam so as to cause said tool to take a shave on a working surface of a tooth of said roughed gear blank in the direction of roll of said working surface, a device for holding said gear blank holding means to said support while a cut is being made, means for releasing said device and means operated by said tool holder for moving said gear holder means in relation to said support after the release of said holding means.

44. In a machine for finishing roughed gear blanks, in combination, a support, a cam mounted about and restrained by said cam and adapted to hold a tool fixed thereon, means on said support for holding a roughed gear blank, mechanism for oscillating said tool holding means about said cam so as to cause said tool to take a shave on a working surface on said roughed gear blank in the direction of roll of said working surface, and means for relatively indexing said cam and said gear holding means, comprising an index wheel fixed to said gear holding means and having a series of depressions therein, a holding dog engageable with said depressions, means for releasing said dog, and a pawl and ratchet device operated from said tool holding means for moving said gear holding means a predetermined amount after the dog is freed from engagement with said depressions.

45. In a machine of the class described, in combination, a support, tool holding means and a blank holding means mounted thereon, mechanism for relatively moving said means so that a tool in said tool holding means operates upon a blank in the blank holding means, and a device for indexing one of said means step by step a predetermined amount, comprising an index plate on said blank holding means having spaced depressions therein, a locking dog movable into engagement with said depressions, mechanism for operating said locking dog automatically to engage and disengage said plate at predetermined times, and mechanism operated by said other means for rotating said one means step by step.

46. In a machine of the class described, in combination, a support, tool holding means and a blank holding means mounted thereon, mechanism for relatively moving said means so that a tool in said tool holding means operates upon a blank in the blank holding means, and a device for indexing one of said means step by step a predetermined amount, comprising an index plate on one of said means, having spaced depressions therein, a locking dog movable into engagement with said depressions, means for operating said dog to engage and disengage said depressions, mechanism for rotating said one means a predetermined amount in one direction and operated by said other means, and means fixed in relation to said index plate for positively stopping rotation in the same direction.

47. In a machine of the class described, in combination, a support, tool holding means and a blank holding means mounted thereon, mechanism for relatively moving said means so that a tool in said tool holding means operates upon a blank in the blank holding means, and a device for indexing one of said means step by step a predetermined amount, comprising an index plate on one of said means, having spaced depressions therein, opposed locking dogs engageable with opposite sides of said index plate, mechanism for operating said dogs to engage and disengage said depressions, ratchet mechanism for rotating said one means a predetermined amount in one direction operated by the other of said means, a device fixed in relation to said index plate for positively stopping rotation in the same direction, and a friction brake to retard movement of said one means.

48. In a gear-finishing machine for cutting gear teeth on a gear, in combination, a support, tool-holding means and an edged cutting tool thereon, means on said support for holding a gear to be finished, and mechanism for relatively moving said two means so that a cut is made on said gear from the end toward the root of a tooth, said mechanism including a master cam fixed with relation to said gear when the gear is being cut, and having an axis concentric with the axis of the gear, said cam having substantially the same shape as the tooth surface to be cut on said gear but many times larger than the tooth surface, slide means on which said tool-holding means is slidably mounted for rectilinear movement, and means operably interconnecting said cam and said tool-holding means for governing the sliding movements of the tool-holding means.

49. A gear-finishing machine for cutting gear teeth on a gear, comprising a support, tool-holding means and an edged cutting tool thereon, means on said support for holding a gear to be finished, and mechanism for relatively moving said two means so that the edge of the tool takes a cut on the gear from the end towards the root of a tooth, said mechanism including a master cam adapted to be fixed with relation to said gear and having an axis concentric with the axis of said gear, said cam having opposite substantially involute surfaces having the same base circle diameter as the base circle diameter of the gear teeth, slide means on which said tool-holding means is slidably mounted for rectilinear movement, and means operably interconnecting said cam and said tool-holding means for governing the sliding movements of the tool-holding means.

50. A gear-finishing machine for cutting gear teeth on a gear comprising a support, tool-holding means having a straight edged cutting tool thereon, a work spindle adapted to be fixed to said support for holding a gear to be finished, and mechanism for moving said tool-holding means so that the edge of the tool takes a cut on the gear from the end towards the root of a tooth, said mechanism comprising a master cam fixed with relation to said work spindle, said cam having a surface many times larger than the tooth surface, slide means on which said tool-holding means is slidably mounted for rectilinear movement, a pivotal connection for the slide means for mounting the slide means for oscillatory movement about the axis of said work spindle, and means operably interconnecting said cam and said tool-holding means for governing the sliding movements of the tool-holding means on said slide means.

In testimony whereof I have hereunto set my hand this 20th day of October, 1924.

JAMES H. BARNES.